(12) United States Patent
Takahashi et al.

(10) Patent No.: US 11,964,533 B2
(45) Date of Patent: Apr. 23, 2024

(54) FASTENER STRUCTURE FOR VEHICLE

(71) Applicant: SUBARU CORPORATION, Tokyo (JP)

(72) Inventors: Kouji Takahashi, Tokyo (JP); Tsuguo Nakazawa, Tokyo (JP); Satoshi Ueda, Tokyo (JP); Jun Shimizu, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/150,667

(22) Filed: Jan. 5, 2023

(65) Prior Publication Data

US 2023/0234416 A1 Jul. 27, 2023

(30) Foreign Application Priority Data

Jan. 21, 2022 (JP) ................................ 2022-007751

(51) Int. Cl.
*B60G 7/02* (2006.01)

(52) U.S. Cl.
CPC ............ *B60G 7/02* (2013.01); *B60G 2204/41* (2013.01); *B60G 2204/4402* (2013.01); *B60G 2206/7102* (2013.01); *B60G 2206/8201* (2013.01)

(58) Field of Classification Search
CPC .............. B60G 7/02; B60G 2204/4402; B60G 2206/7102; B60G 2206/8201; B60G 13/003; B60G 13/005
See application file for complete search history.

(56) References Cited

U.S. PATENT DOCUMENTS 8,746,718 B2 * 6/2014 Otani ...................... B60G 7/02
280/124.109
11,192,589 B2 * 12/2021 Okamoto ............... B62D 21/11

FOREIGN PATENT DOCUMENTS

| JP | H0699845 A | * | 9/1992 |
| JP | 2007-253642 A | | 10/2007 |
| KR | 20210029036 A | * | 3/2021 |

OTHER PUBLICATIONS

KR20210029036A Machine English translation (Year: 2021).*
JPH0699845 A Machine English translation (Year: 1992).*

* cited by examiner

*Primary Examiner* — Jason D Shanske
*Assistant Examiner* — Matthew James O'Neill
(74) *Attorney, Agent, or Firm* — Smith, Gambrell & Russell, LLP

(57) ABSTRACT

In a fastener structure for a vehicle, a height adjustment spacer is interposed between first and second vehicle body frames fixed with a bolt and a nut. The nut has a first insertion hole through which a bolt is screwed, and is fixed to a surface of the first vehicle body frame. The height adjustment spacer has a second insertion hole through which the bolt is inserted, and is disposed in contact with another surface of the first vehicle body frame. The bolt is inserted through an attachment hole of the second vehicle body frame, the second insertion hole, an attachment hole of the first vehicle body frame, and the first insertion hole. On a contact surface between the height adjustment spacer and the first vehicle body frame, a protrusion and a recess are provided to surround an entirety of the second insertion hole, the second insertion hole respectively.

21 Claims, 3 Drawing Sheets

FASTENER STRUCTURE FOR VEHICLE

CROSS-REFERENCE TO RELATED APPLICATIONS

The present application claims priority from Japanese Patent Application No. 2022-007751 filed on Jan. 21, 2022, the entire contents of which are hereby incorporated by reference.

BACKGROUND

The disclosure relates to a fastener structure for a vehicle.

Japanese Unexamined Patent Application Publication (JP-A) No. 2007-253642 discloses a fastener structure for a vehicle in the related art, in which a drive unit is coupled to a suspension member via a coupling body and a pivot shaft. In order to improve coupling strength between the coupling body and the suspension member, the suspension member includes upper and lower plate members, a bulkhead that joins the upper and lower plate members, and a reinforcing body that couples the upper and lower plate members and the bulkhead.

On the other hand, the pivot shaft includes a collar disposed between the reinforcing bodies and a fastener that fastens the reinforcing bodies and the suspension member together. Provided is a structure in which plate members, which form the reinforcing bodies and the suspension member, are sandwiched between an upper end of the collar and a nut, and between a lower end of the collar and a bolt head.

SUMMARY

An aspect of the disclosure provides a fastener structure for a vehicle in which a height adjustment spacer is interposed between a first vehicle body frame and a second vehicle body frame, and the first vehicle body frame and the second vehicle body frame are fixed by bolt fastening using a bolt and a nut. The fastener structure includes the nut, the height adjustment spacer, and the bolt. The nut has a first insertion hole through which the bolt is screwed, and is fixed to an inner side surface of the first vehicle body frame by welding. The height adjustment spacer has a second insertion hole through which the bolt is inserted, and is disposed in contact with an outer side surface of the first vehicle body frame. The bolt that is inserted through an attachment hole of the second vehicle body frame, the second insertion hole, an attachment hole of the first vehicle body frame, and the first insertion hole. On a contact surface between the height adjustment spacer and the first vehicle body frame, a protrusion is provided to surround an entirety of the second insertion hole, and a recess is provided to surround an entirety of the second insertion hole in the vicinity of the protrusion.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

Figure 1:
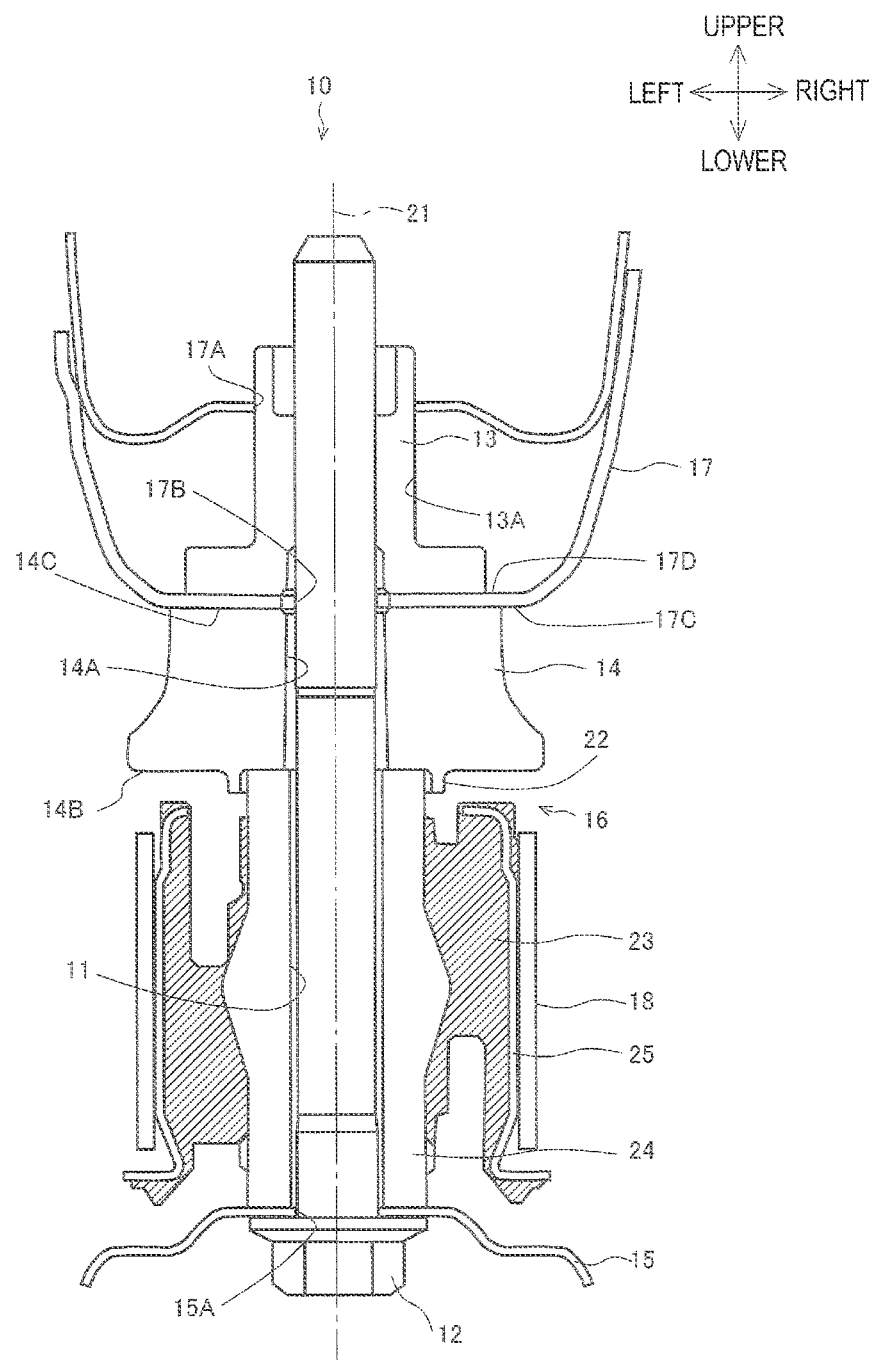
FIG. 1 is a cross-sectional view illustrating a fastener structure for a vehicle according to an embodiment of the disclosure.

In the fastener structure of the related art described above, water may enter from between the upper end of the collar and the plate members and from between the nut or the bolt head and the plate members, and the entered water may accumulate inside the collar. When water accumulates inside the collar, galvanic corrosion occurs between the bolt and surrounding dissimilar metal components, and hydrogen is generated. There is a problem that the generated hydrogen is adsorbed by the bolt and diffused into a crystal grain boundary, and the bolt may be fractured by hydrogen embrittlement fatigue.

It is desirable to provide a fastener structure for a vehicle that prevents hydrogen embrittlement fracture of a bolt forming the fastener structure due to galvanic corrosion between dissimilar metals caused by water entering the inside of the fastener structure for the vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

A fastener structure 10 of a vehicle according to the embodiment of the disclosure will be described in detail with reference to the drawings. In a description of the embodiment, the same members are denoted by the same reference numerals in principle, and redundant descriptions will be omitted. In the following description, an upper-lower direction indicates a height direction of the vehicle, a left-right direction indicates a lateral direction as viewed from the front of the vehicle, and a front-rear direction indicates a longitudinal direction of the vehicle.

Figure 2:
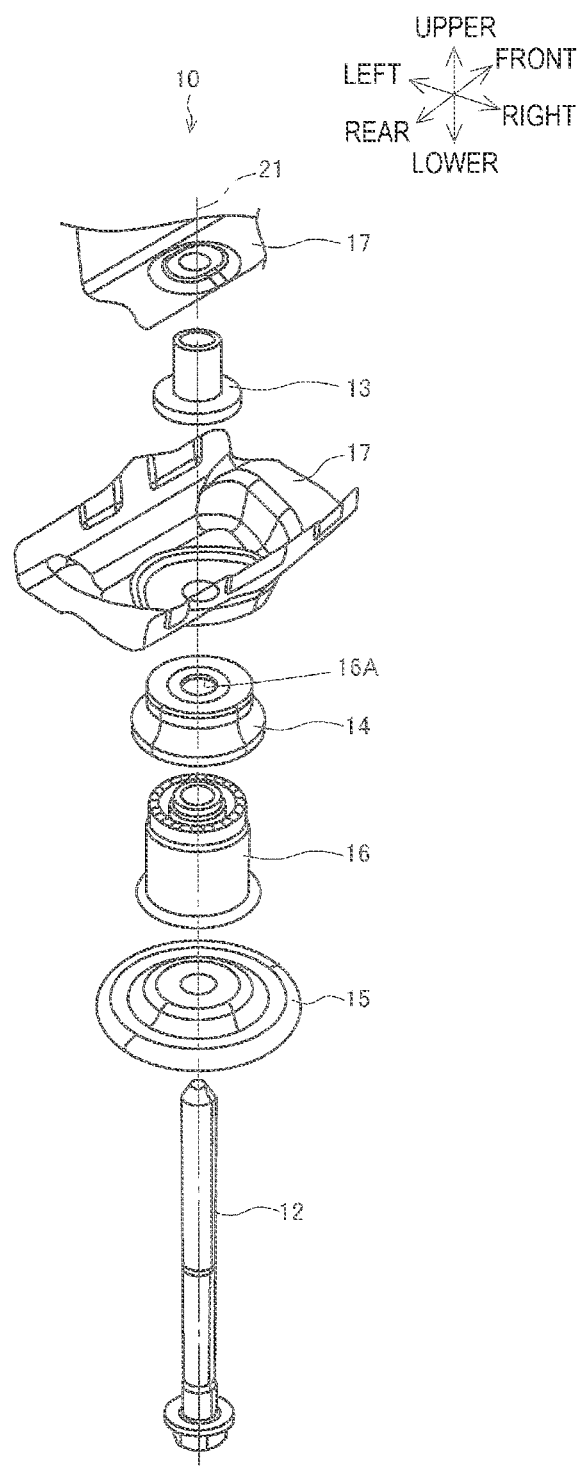
FIG. 2 is an exploded perspective view illustrating the fastener structure for the vehicle according to the embodiment of the disclosure.
Figure 3:
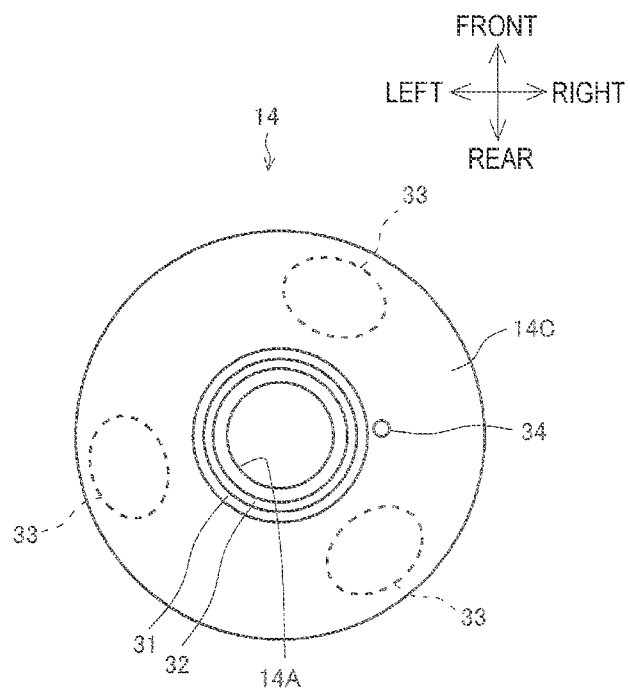
FIG. 3 is a top view illustrating the fastener structure for the vehicle according to the embodiment of the disclosure.
Figure 4:
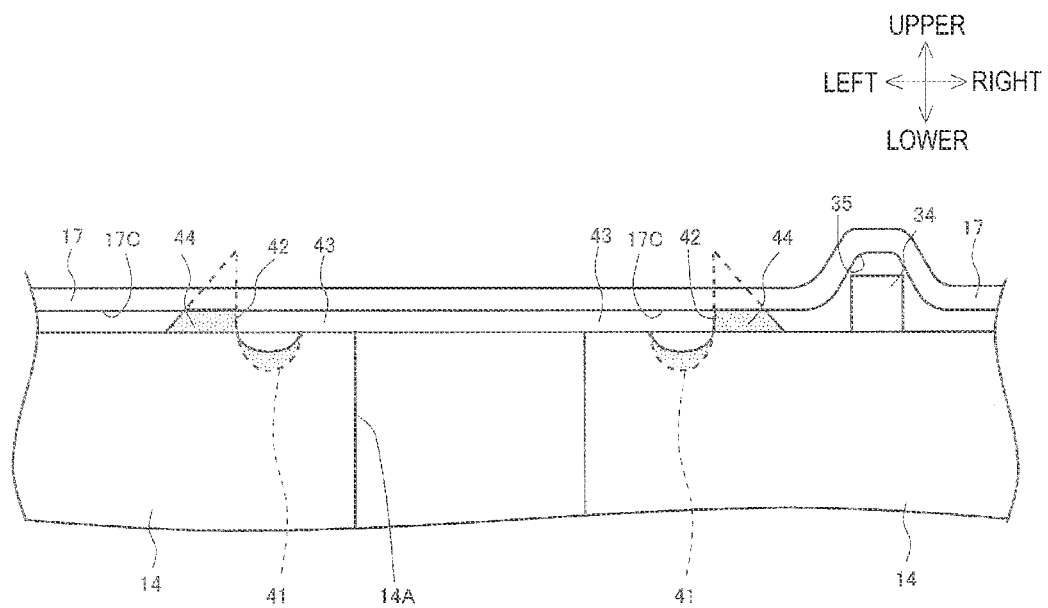
FIG. 4 is a cross-sectional view illustrating a fastener structure for the vehicle according to the embodiment of the disclosure.

FIG. 1 is a cross-sectional view illustrating the fastener structure 10 of the vehicle according to the embodiment. FIG. 2 is an exploded perspective view illustrating the fastener structure 10 of the vehicle according to the embodiment. FIG. 3 is a top view illustrating a height adjustment spacer 14 of the fastener structure 10 of the vehicle according to the embodiment. FIG. 4 is a cross-sectional view illustrating the height adjustment spacer 14 of the fastener structure 10 of the vehicle according to the embodiment.

As illustrated in FIGS. 1 and 2, the fastener structure 10 of the vehicle is used, for example, to fix a suspension member 17 and a suspension frame 18 when a common standard suspension is used to change the lowest ground clearance of the vehicle in accordance with each vehicle model. The suspension member 17 corresponds to a first vehicle body frame according to the embodiment of the disclosure, and the suspension frame 18 corresponds to a second vehicle body frame according to the embodiment of the disclosure.

Herein, in a specification of each vehicle model, automobiles having different vehicle heights are manufactured according to purposes of use, and the like. Manufacturing a unique suspension for each of the vehicle models causes an increase in manufacturing cost. Therefore, the height adjustment spacer 14 is interposed between the suspension member 17 and the suspension frame 18, so that an all-purpose suspension is achieved and an increase in the manufacturing cost is prevented.

As illustrated, the fastener structure 10 of the vehicle mainly includes a bolt 12, a weld nut 13, the height adjustment spacer 14, a plate nut 15, and a bush 16. The fastener structure 10 of the vehicle fixes the suspension member 17 and the suspension frame 18 by bolt fastening, in a state in which the height adjustment spacer 14 is interposed between the suspension member 17 and the suspension frame 18.

The weld nut 13 is inserted through an attachment hole 17A provided in the suspension member 17 and is fixed to an inner side surface 17D of the suspension member 17 by welding. An insertion hole 13A for screwing the bolt 12 is formed in a center of the weld nut 13. Dot-dash lines indicate an axial center 21 of the bolt 12, and a center of the insertion hole 13A of the weld nut 13 is located on the axial center 21 indicated by the dot-dash lines. Centers of attachment holes 17A and 17B of the suspension member 17 are located on the axial center 21 indicated by the dot-dash lines. The insertion hole 13A corresponds to a first insertion hole according to the embodiment of the disclosure.

With this structure, the weld nut 13 is fixed to the suspension member 17 by welding, and an upper side of the weld nut 13 is sandwiched by the suspension member 17 via the attachment hole 17A. The weld nut 13 is fixed to the suspension member 17 by welding in advance, so that the weld nut 13 serves as a positioning member when the suspension frame 18 is assembled to the suspension member 17.

The height adjustment spacer 14 has a substantially cylindrical shape, and an upper end surface 14C and a lower end surface 14B thereof are formed as flat surfaces of a circular shape. The height adjustment spacer 14 is made of aluminum or aluminum alloy and can be reduced in weight. A material for the height adjustment spacer 14 is not limited to aluminum or aluminum alloy, and may also be a light metal such as zinc or magnesium or a light metal alloy. In addition, a steel material subjected to a rust-proof treatment can also be used as the material.

An insertion hole 14A through which the bolt 12 is inserted is formed in a center of the height adjustment spacer 14. An inner diameter of the insertion hole 14A substantially matches an outer diameter of the bolt 12. A center of the insertion hole 14A of the height adjustment spacer 14 is located on the axial center 21 indicated by the dot-dash lines. The insertion hole 14A corresponds to a second insertion hole according to the embodiment of the disclosure.

An annular locking protrusion 22 is formed on the lower end surface 14B of the height adjustment spacer 14 to circle around the insertion hole 14A. The locking protrusion 22 is fitted to an inner cylinder 24 of the bush 16. With this structure, the height adjustment spacer 14 is less likely to detach from the bush 16 or to deviate relative to the bush 16 during an assembling operation or transportation. On the other hand, as will be described in detail later, the upper end surface 14C of the height adjustment spacer 14 comes into contact with an outer side surface 17C of the suspension member 17. An annular protrusion 31 (see FIG. 3) and a recess 32 (see FIG. 3) are formed on the upper end surface 14C to circle around the insertion hole 14A.

The bush 16 mainly includes the inner cylinder 24 and an outer cylinder 25 that are made of a steel material, and an anti-vibration rubber 23. Centers of the inner cylinder 24 and the outer cylinder 25 are positioned on the axial center 21 indicated by the dot-dash lines. The anti-vibration rubber 23 is interposed between the inner cylinder 24 and the outer cylinder 25.

The bush 16 is press-fit into a desired location of the suspension frame 18. The bolt 12 is inserted into the inner cylinder 24 of the bush 16. That is, the inner cylinder 24 of the bush 16 is used as an attachment hole 11 of the suspension frame 18. As illustrated, in a state in which the bush 16 is placed on an upper surface of the plate nut 15, the bolt 12 is inserted through the plate nut 15 from below.

The bolt 12 is, for example, a high-strength steel bolt. The bolt 12 is sequentially inserted into, from below the plate nut 15 toward above in the height direction of the vehicle, an insertion hole 15A of the plate nut 15, the attachment hole 11 of the suspension frame 18, the insertion hole 14A of the height adjustment spacer 14, the attachment hole 17B of the suspension member 17, and the insertion hole 13A of the weld nut 13. The bolt 12 is screwed into the weld nut 13 so that the suspension frame 18 is fixed with respect to the suspension member 17.

As illustrated in FIG. 3, the upper end surface 14C of the height adjustment spacer 14 is a flat surface that is a substantially horizontal surface with respect to the axial center 21 indicated by the dot-dash lines. The insertion hole 14A is formed in a center of the upper end surface 14C. The protrusion 31 and the recess 32 are formed on the upper end surface 14C around the insertion hole 14A. The protrusion 31 and the recess 32 are formed in an annular shape to circle around the insertion hole 14A on an outer side. For example, as illustrated by dotted lines 41 in FIG. 4, the recess 32 is formed between the insertion hole 14A and the protrusion 31, and the protrusion 31 is formed continuously with the recess 32.

Regions indicated by dotted-line circles illustrate welding regions 33 where the weld nut 13 is projection-welded to the inner side surface 17D of the suspension member 17. The weld nut 13 is projection-welded to the suspension member 17, so that the welding regions 33 of the suspension member 17 protrude toward the height adjustment spacer 14.

That is, the outer side surface 17C (see FIG. 4) of the suspension member 17 is formed into a flat surface. However, the outer side surface 17C may be deformed into a somewhat uneven surface due to the above-described welding operation. As a result, the outer side surface 17C of the suspension member 17 is less likely to be in close contact with the upper end surface 14C of the height adjustment spacer 14 over a substantially entire surface after fastening. Water may enter a gap 43 (see FIG. 4) between the outer side surface 17C of the suspension member 17 and the upper end surface 14C of the height adjustment spacer 14 from external space.

As illustrated, an alignment protrusion 34 is formed on an outer side of the protrusion 31 of the upper end surface 14C. As will be described in detail later, the suspension member 17 is formed with an alignment recess 35 (see FIG. 4) from the outer side surface 17C thereof.

As illustrated in FIG. 4, when the bolt 12 is fastened to the weld nut 13, the upper end surface 14C of the height adjustment spacer 14 and the outer side surface 17C of the suspension member 17 are in a state of being pressed against each other. As described above, the suspension member 17 is made of a steel material, and the height adjustment spacer 14 is made of aluminum or aluminum alloy.

With this structure, as illustrated by hatching 44, most of the protrusion 31 is crushed toward the recess 32 by compressive deformation due to a difference in hardness between the height adjustment spacer 14 and the suspension member 17. On the other hand, the crushed protrusion 31 is embedded in the recess 32. At this time, not all the protrusion 31 is compressed and deformed toward the recess 32, and a part of the protrusion 31 remains as an annular water-blocking wall 42 on the upper end surface 14C around the recess 32. As a result, in the gap 43, the insertion hole 14A is partitioned from the external space by the water-blocking wall 42. The outer side surface 17C of the suspension member 17 abuts against a top surface of the water-blocking wall 42 in an annular shape.

When the vehicle travels in rain, for example, water is blocked by the water-blocking wall 42 and prevented from flowing into the insertion hole 14A even though the water enters the gap 43. The galvanic corrosion is prevented from occurring, in the gap 43 and the insertion hole 14A that are inside the water-blocking wall 42, between the height adjustment spacer 14 and the suspension member 17 and the bolt 12. As a result, generation of hydrogen due to the galvanic corrosion is prevented, and the bolt 12 is prevented from being lowered in strength or fractured due to hydrogen embrittlement fatigue.

As illustrated, when the protrusion 31 is compressed and deformed, the alignment protrusion 34 of the upper end surface 14C of the height adjustment spacer 14 is accommodated in the alignment recess 35 of the suspension member 17. Therefore, the alignment protrusion 34 maintains a shape thereof without being compressed and deformed by the suspension member 17 even after the fastener structure 10 of the vehicle is fastened.

During a repair operation or the like of the vehicle due to an accident, the suspension frame 18 is detached from the suspension member 17, so that the height adjustment spacer 14 is also detached. After the repair operation is completed, when the suspension frame 18 is assembled to the suspension member 17, the same height adjustment spacer 14 can be reused. That is, the alignment protrusion 34 of the height adjustment spacer 14 maintains the current shape without being compressed and deformed, so that alignment with the outer side surface 17C of the suspension member 17 is possible. As a result, the height adjustment spacer 14 can be repeatedly used, and the manufacturing cost can be reduced.

In the embodiment, a case where the protrusion 31 is formed continuously with the recess 32 and the protrusion 31 is formed on an outer side of the recess 32 in the height adjustment spacer 14 has been described, but the disclosure is not limited to this case. For example, the protrusion 31 may be formed on an inner side of the recess 32. The protrusion 31 may simply be compressed and deformed and move to the recess 32, and may simply be in the vicinity of the recess 32 rather than to be formed continuously with each other.

In addition, a case where the fastener structure 10 of the vehicle is used in a fastener between the suspension member 17 and the suspension frame 18 has been described, but the disclosure is not limited to this case. The fastener structure 10 of the vehicle is also used, for example, at other fastening locations where a height of the vehicle is adjusted using the height adjustment spacer 14, and it is possible to obtain an effect of preventing water from entering the inside of the fastening locations. In addition, various modifications and alterations can be made without departing from the gist of the disclosure.

A fastener structure for a vehicle according to the disclosure includes a protrusion and a recess that are formed on a contact surface between a height adjustment spacer and a first vehicle body frame to circle around a second insertion hole. When a bolt is fastened to a nut, a part of the protrusion is compressed and deformed into the recess. A water-blocking wall defined by the protrusion is formed on the contact surface, and a top surface of the water-blocking wall abuts against the first vehicle body frame. With this structure, water is prevented from entering the inside of the height adjustment spacer during traveling of the vehicle or the like. Thus, galvanic corrosion between dissimilar metals is prevented from occurring, and hydrogen embrittlement fracture of the bolt forming the fastener structure is prevented.

The invention claimed is:

1. A fastener structure for a vehicle in which a height adjustment spacer is interposed between a first vehicle body frame and a second vehicle body frame, and the first vehicle body frame and the second vehicle body frame are fixed by bolt fastening using a bolt and a nut, the fastener structure comprising:
    the nut having a first insertion hole through which the bolt is screwed, and being fixed to an inner side surface of the first vehicle body frame by welding;
    the height adjustment spacer having a second insertion hole through which the bolt is inserted, and being disposed in contact with an outer side surface of the first vehicle body frame; and
    the bolt being inserted through an attachment hole of the second vehicle body frame, the second insertion hole, an attachment hole of the first vehicle body frame, and the first insertion hole, wherein
    on a contact surface between the height adjustment spacer and the first vehicle body frame, a protrusion is provided to surround an entirety of the second insertion hole, and a recess is provided to surround an entirety of the second insertion hole in the vicinity of the protrusion, and wherein an alignment protrusion is provided on the contact surface of the height adjustment spacer, and the first vehicle body frame is provided with an alignment recess into which the alignment protrusion is inserted.

2. The fastener structure according to claim 1, wherein the height adjustment spacer is made of aluminum or aluminum alloy.

3. The fastener structure according to claim 2, wherein the attachment hole of the second vehicle body frame is defined by an inner cylinder of a bush fixed to the second vehicle body frame.

4. The fastener structure according to claim 3, wherein the first vehicle body frame is a suspension member, and the second vehicle body frame is a suspension frame.

5. A fastener structure for a vehicle in which a height adjustment spacer is interposed between a first vehicle body frame and a second vehicle body frame, and the first vehicle body frame and the second vehicle body frame are fixed by bolt fastening using a bolt and a nut, the fastener structure comprising:

the nut having a first insertion hole through which the bolt is screwed, and being fixed to an inner side surface of the first vehicle body frame by welding;

the height adjustment spacer having a second insertion hole through which the bolt is inserted, and being disposed in contact with an outer side surface of the first vehicle body frame; and the bolt being inserted through an attachment hole of the second vehicle body frame, the second insertion hole, an attachment hole of the first vehicle body frame, and the first insertion hole, wherein on a contact surface between the height adjustment spacer and the first vehicle body frame, a protrusion is provided to surround an entirety of the second insertion hole, and a recess is provided to surround an entirety of the second insertion hole in the vicinity of the protrusion, and wherein the attachment hole of the second vehicle body frame is defined by an inner cylinder of a bush fixed to the second vehicle body frame.

6. The fastener structure according to claim 5, wherein the first vehicle body frame is a suspension member, and the second vehicle body frame is a suspension frame.

7. The fastener structure according to claim 5, wherein a portion of the protrusion, when in a state of being compressed against the outer side surface of the first vehicle body frame, extends into the recess in the vicinity of the protrusion.

8. The fastener structure according to claim 5 wherein the height adjustment spacer has a lower annular locking protrusion engaged with the inner cylinder of the bush.

9. The fastener structure according to claim 5, wherein an alignment protrusion is provided on the contact surface of the height adjustment spacer, and the first vehicle body frame is provided with an alignment recess into which the alignment protrusion is inserted.

10. A fastener structure for a vehicle in which a height adjustment spacer is interposed between a first vehicle body frame and a second vehicle body frame, and the first vehicle body frame and the second vehicle body frame are fixed by bolt fastening using a bolt and a nut, the fastener structure comprising:

the nut having a first insertion hole through which the bolt is screwed, and being fixed to an inner side surface of the first vehicle body frame by welding;

the height adjustment spacer having a second insertion hole through which the bolt is inserted, and being disposed in contact with an outer side surface of the first vehicle body frame; and the bolt being inserted through an attachment hole of the second vehicle body frame, the second insertion hole, an attachment hole of the first vehicle body frame, and the first insertion hole, wherein on a contact surface between the height adjustment spacer and the first vehicle body frame, a protrusion is provided to surround an entirety of the second insertion hole, and a recess is provided to surround an entirety of the second insertion hole in the vicinity of the protrusion, and wherein the height adjustment spacer has an uppermost, annular surface surrounding the protrusion, and the protrusion extends above that uppermost surface of the height adjustment spacer and below the outer side surface of the first vehicle body frame as to be compressed against the outer side surface of the first vehicle body frame.

11. The fastener structure according to claim 10, wherein an alignment protrusion is provided on the contact surface of the height adjustment spacer, and the first vehicle body frame is provided with an alignment recess into which the alignment protrusion is inserted.

12. The fastener structure according to claim 11, wherein the height adjustment spacer is made of aluminum or aluminum alloy.

13. The fastener structure according to claim 11, wherein the attachment hole of the second vehicle body frame is defined by an inner cylinder of a bush fixed to the second vehicle body frame.

14. The fastener structure according to claim 12, wherein the attachment hole of the second vehicle body frame is defined by an inner cylinder of a bush fixed to the second vehicle body frame.

15. The fastener structure according to claim 13, wherein the first vehicle body frame is a suspension member, and the second vehicle body frame is a suspension frame.

16. The fastener structure according to claim 14, wherein the first vehicle body frame is a suspension member, and the second vehicle body frame is a suspension frame.

17. The fastener structure according to claim 10, wherein a portion of the protrusion, when in a state of being compressed against the outer side surface of the first vehicle body frame, extends into the recess in the vicinity of the protrusion.

18. The fastener structure according to claim 17, wherein the protrusion is of a lower hardness than the outer side surface of the first vehicle body frame as to enable deformation into the recess in the vicinity of the protrusion when in the state of being compressed against the outer side surface of the first vehicle body frame.

19. The fastener structure according to claim 10, wherein the uppermost surface of the annular surface surrounding the protrusion defines a gap spacing between the uppermost surface and adjacent outer side surface of the first vehicle body frame, and the protrusion defines a water blocking wall radially inward of the gap spacing wherein water may enter.

20. The fastener structure according to claim 7, wherein an uppermost surface of an annular surface surrounding the protrusion defines a gap spacing between the uppermost surface and adjacent outer side surface of the first vehicle body frame, and the protrusion defines a water blocking wall radially inward of the gap spacing wherein water may enter.

21. A fastener structure of a vehicle in which a height adjustment spacer is interposed between a first vehicle body frame and a second vehicle body frame, and the first vehicle body frame and the second vehicle body frame are fixed by bolt fastening using a bolt and a nut, the fastener structure comprising:

the nut having a first insertion hole through which the bolt is screwed, and fixed to an inner side surface of the first vehicle body frame by welding;

the height adjustment spacer having a second insertion hole through which the bolt is inserted, and disposed in contact with an outer side surface of the first vehicle body frame; and the bolt being inserted through an attachment hole of the second vehicle body frame, the second insertion hole, an attachment hole of the first vehicle body frame, and the first insertion hole, wherein on a contact surface between the height adjustment spacer and the first vehicle body frame, a protrusion is formed to circle around the second insertion hole, and a recess is formed to circle around the second insertion hole in the vicinity of the protrusion, and wherein
the protrusion is compressed and deformed into the recess to define a water blocking wall on the contact surface.

\* \* \* \* \*